US008831370B2

(12) United States Patent  
Archer

(10) Patent No.: US 8,831,370 B2  
(45) Date of Patent: Sep. 9, 2014

(54) WAVELENGTH DIVERSE SCINTILLATION REDUCTION

(75) Inventor: Cynthia I. Archer, Sherwood, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 93 days.

(21) Appl. No.: 13/371,301

(22) Filed: Feb. 10, 2012

(65) Prior Publication Data

US 2012/0207401 A1 Aug. 16, 2012

Related U.S. Application Data

(60) Provisional application No. 61/441,609, filed on Feb. 10, 2011.

(51) Int. Cl.
| G06K 9/40 | (2006.01) |
| G06T 5/50 | (2006.01) |
| G01J 3/36 | (2006.01) |
| G02B 27/48 | (2006.01) |
| G06T 5/00 | (2006.01) |
| G01J 3/28 | (2006.01) |
| G02B 27/00 | (2006.01) |

(52) U.S. Cl.  
CPC . G06T 5/006 (2013.01); G06T 5/50 (2013.01); G01J 3/36 (2013.01); *G06T 2207/20182* (2013.01); G02B 27/48 (2013.01); *G06T 2207/30252* (2013.01); *G06K 9/40* (2013.01); G01J 3/28 (2013.01); G02B 27/0025 (2013.01)  
USPC ........... 382/254; 382/151; 382/274; 324/300; 324/307

(58) Field of Classification Search  
CPC ... G06K 9/209; G06K 9/0063; H04N 9/3197; H04N 9/3185; G01R 33/56509; G01R 33/56554; G01R 33/56536; G06T 2207/30181; G06T 2207/20182; G06T 5/006; G06T 19/00; G06T 5/50; G01J 3/28; G01J 3/36; G02B 27/0025; G02B 27/48; A63F 2300/1093; A63F 2300/6045; A63B 43/008; A61B 8/08  
USPC .................... 382/191, 254, 274; 324/300, 307  
See application file for complete search history.

(56) References Cited

U.S. PATENT DOCUMENTS 4,565,022 A * 1/1986 Chapin ........................... 40/442  
4,703,572 A * 11/1987 Chapin ........................... 40/442

(Continued)

OTHER PUBLICATIONS

Young, Lee W., Authorized officer, International Searching Authority, International Search Report, PCT Patent Application Serial No. PCT/US2012/024766, search completion date: May 22, 2012; mailing date: May 29, 2012.

(Continued)

*Primary Examiner* — Vu Le  
*Assistant Examiner* — Aklilu Woldemariam  
(74) *Attorney, Agent, or Firm* — Kolisch Hartwell, P.C.

(57) ABSTRACT

Systems, including apparatus and methods, for obtaining and/or correcting images, particularly from atmospheric and/or other distortions. These corrections may involve, among others, collecting two or more sets of image data corresponding to images of the same scene in different wavelength regimes, and using correlations between wavelength and expected distortion to distinguish apparent image motion due to distortion from apparent image motion due to object or scene motion. These systems may be useful in any suitable imaging context, including navigation, targeting, search and rescue, law enforcement, commercial video cameras and/or surveillance, among others.

15 Claims, 3 Drawing Sheets

(56) References Cited

U.S. PATENT DOCUMENTS

| | | | |
|---|---|---|---|
| 6,473,535 B1* | 10/2002 | Takaoka | 382/274 |
| 6,882,368 B1* | 4/2005 | Suda | 348/340 |
| 7,515,767 B2 | 4/2009 | Miller et al. | |
| 7,990,371 B2* | 8/2011 | Bar-Zohar et al. | 345/204 |
| 2002/0041383 A1* | 4/2002 | Lewis et al. | 358/1.9 |
| 2005/0116710 A1* | 6/2005 | Ordidge et al. | 324/309 |
| 2005/0238362 A1* | 10/2005 | Sekiya et al. | 398/147 |
| 2007/0003155 A1* | 1/2007 | Miller et al. | 382/254 |
| 2009/0115916 A1* | 5/2009 | Kondo et al. | 348/745 |
| 2009/0195247 A1 | 8/2009 | Pfeuffer et al. | |
| 2010/0002947 A1* | 1/2010 | Riley et al. | 382/254 |

OTHER PUBLICATIONS

Young, Lee W., Authorized officer, International Searching Authority, Written Opinion of the International Searching Authority, PCT Patent Application Serial No. PCT/US2012/024766, opinion completion date: May 22, 2012; opinion date: May 29, 2012.

Zakynthinaki and Saridakis, "Stochastic optimization for a tip-tilt adaptive correcting system." Computer Physics Communications 150 (2003) 274-292.

* cited by examiner

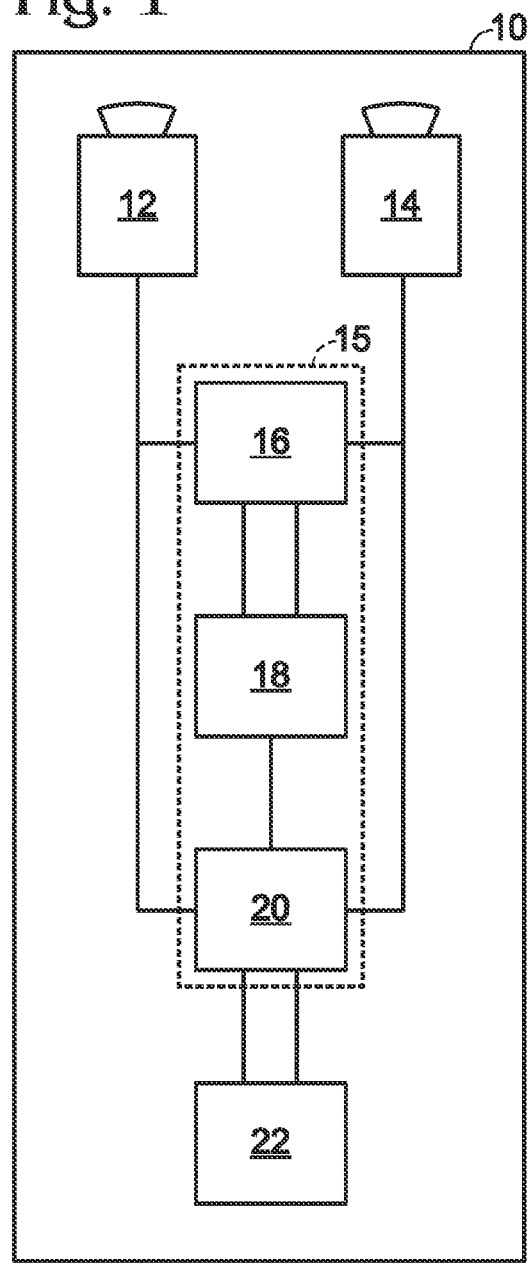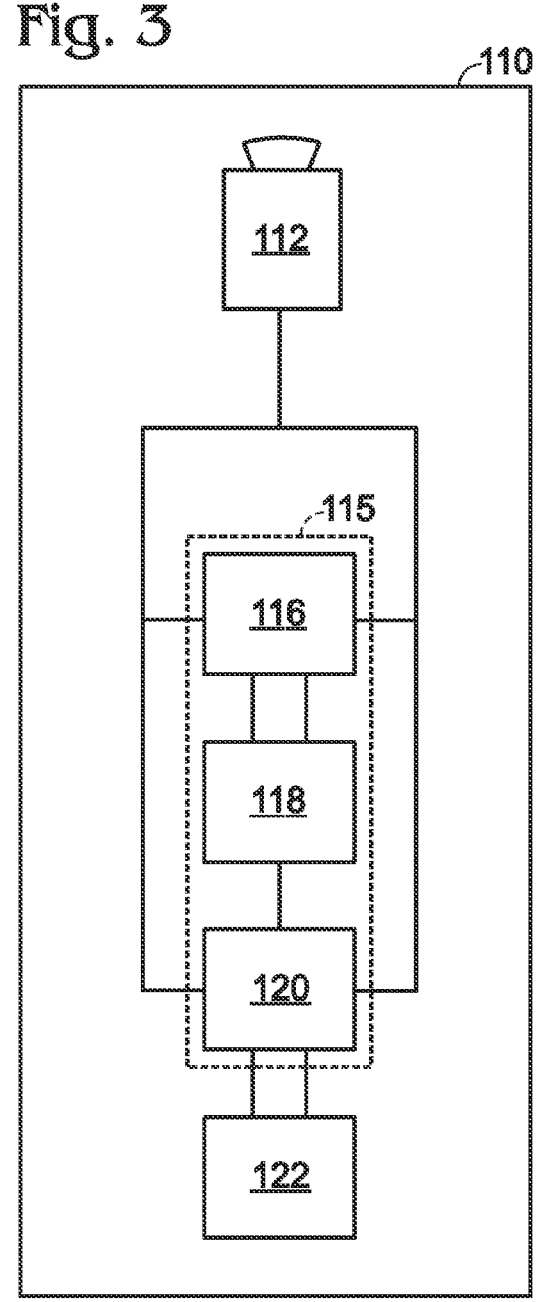

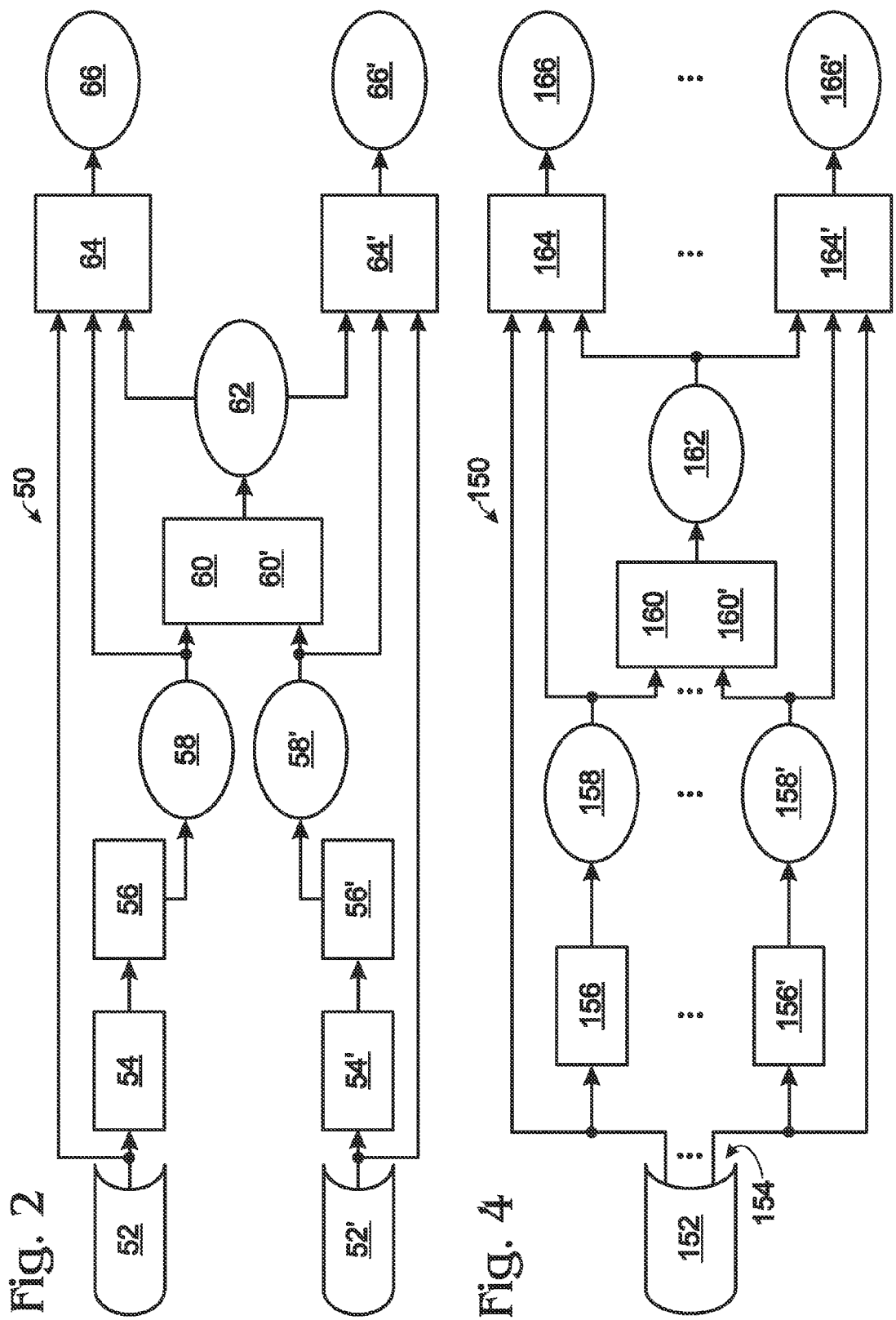

WAVELENGTH DIVERSE SCINTILLATION REDUCTION

CROSS-REFERENCE TO RELATED APPLICATION

This application is based upon and claims the benefit under 35 U.S.C. §119(e) of U.S. Provisional Patent Application Ser. No. 61/441,609, filed Feb. 10, 2011, which is incorporated herein by reference in its entirety for all purposes.

INTRODUCTION

Optical systems may be used to form and/or record images of objects and/or scenes. Unfortunately, when an optical system obtains images based on image data that have passed through a medium, the images obtained generally will be distorted both by the medium and by the components of the optical system itself. For example, the image of an object viewed with a telescope or other long-range imaging system may be distorted both by atmospheric effects (e.g., the scintillation, convection, turbulence, scatter, and varying index of refraction of the atmosphere, among others, which can induce various spatial and temporal perturbations in the incoming wavefront, etc.), and by mechanical, thermal, and optical limitations of the instrument (e.g., path-length error introduced by out-of-focus components of the field of view, limitations on the collection of spatial frequencies imposed by the objective aperture, uncorrected aberration in the objective lens, mirror deformations generated by supporting devices, etc.). These distortions occur, for example, when ground-based telescopes (or other imaging instruments) obtain images of objects on the ground, in the air, or in space, and when airborne or space-based telescopes (or other imaging instruments) in aircraft or on satellites obtain images of objects within Earth's atmosphere, such as objects on or near Earth's surface. This also may occur in situations in which an imaging system and the object to be imaged are separated primarily horizontally, or both horizontally and vertically, by a portion of the Earth's atmosphere.

The effects of atmospheric distortion can significantly limit image resolution. For example, atmospheric distortion can limit the best "seeing conditions" to approximately one microradian at high-altitude astronomical observatories, looking straight up. The limiting resolution becomes rapidly worse for lower-altitude and near-horizontal viewing scenarios typical for cameras and electro-optical systems.

Various methods have been developed to mitigate or eliminate the effects of image distortion. These methods generally rely on obtaining corrective information within the wavelength regime(s) in which imaging data are desired. For example, visible image data are used to correct visible images, and infrared image data are used to correct infrared images. However, calculating corrections using multispectral images has advantages that have not been previously exploited.

The disadvantages associated with known image correction techniques may be particularly apparent when attempting to correct for scintillation. Scintillation (or twinkling) is a variation in light (e.g., light intensity) received from an object. Scintillation is generally cyclical in nature, with a typical period of several seconds, and many existing techniques for removing scintillation rely on integrating motion over at least one complete cycle. Accordingly, existing algorithms used to correct for scintillation often result in significant delays in producing corrected images. They also have the undesirable effect of blurring or smearing moving objects. This is undesirable for any system mounted on a moving platform, such as an aircraft or ground vehicle, or for any other system in which viewing images in real time or near real time is important. In such cases, a need exists for an effective and practical means of eliminating, or at least mitigating, atmospheric distortion effects including scintillation.

SUMMARY

The present teachings provide systems, including apparatus and methods, for obtaining and/or correcting images, particularly from scintillation and/or other turbulence-induced distortions. These corrections may involve, among others, collecting two or more sets of image data corresponding to images of the same scene in different wavelength regimes, and using correlations between wavelength and expected distortion to distinguish apparent image motion due to distortion from apparent image motion due to object or scene motion. These systems may be useful in any suitable imaging context, including navigation, targeting, search and rescue, law enforcement, and/or surveillance, among others.

BRIEF DESCRIPTION OF THE FIGURES

FIG. 1 is a schematic diagram depicting a first exemplary embodiment of an image correction system according to aspects of the present teachings.

FIG. 2 is a flow chart depicting a first exemplary method for correcting images according to aspects of the present teachings.

FIG. 3 is a schematic diagram depicting a second exemplary embodiment of an image correction system according to aspects of the present teachings.

FIG. 4 is a flow chart depicting a second exemplary method for correcting images according to aspects of the present teachings.

DEFINITIONS

Figure 5:
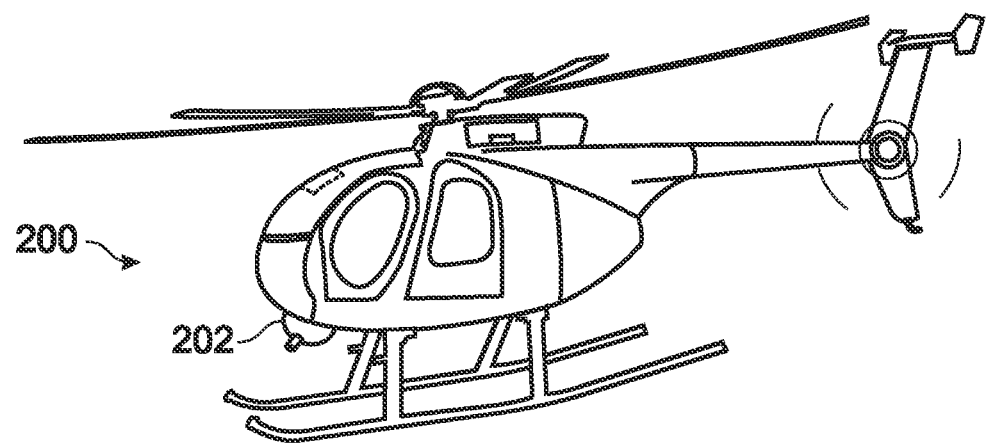
FIG. 5 is a view of an exemplary support platform (namely a helicopter) equipped with an image correction system according to aspects of the present teachings.

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation. Electromagnetic radiation, invisible to the normal human eye, having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Electromagnetic radiation, visible to the normal human eye, having wavelengths from about 360 or 400 nanometers, just longer than ultraviolet radiation, to about 760 or 800 nanometers, just shorter than infrared radiation. Visible light typically may be imaged and detected by the unaided human eye and includes violet (about 390-425 nm), indigo (about 425-445 nm), blue (about 445-500 nm), green (about 500-575 nm), yellow (about 575-585 nm), orange (about 585-620 nm), and red (about 620- 740 nm) light, among others.

Infrared (IR) radiation. Electromagnetic radiation, invisible to the normal human eye, having wavelengths from about 700 or 800 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared range having wavelengths between about 3,000 and 5,000 nm (i.e., between about 3 and 5 µm) and between about 7,000 or 8,000 and 14,000 nm (i.e., between about 7 or 8 and 14 µm) may be especially useful in thermal imaging, because they correspond to minima in atmospheric absorption and thus are more easily detected (particularly at a distance). The particular interest in relatively shorter wavelength IR radiation has led to the following classifications: (A) near infrared (NIR) (from about 780 nm to about 1,000 nm (1 µm), (B) short-wave infrared (SWIR) (from about 1,000 nm (1 µm) to about 3,000 nm (3 µm)), (C) mid-wave infrared (MWIR) (from about 3,000 nm (3 µm) to about 8,000 nm (8 µm), or about 3 µm to 5 µm), (D) long-wave infrared (LWIR) (from about 6,000 nm (8 µm) to about 15,000 nm (15 µm), or about 8 µm to 12 µm), and (E) very long-wave infrared (VLWIR) or far infrared (FIR) (from about 15,000 nm (15 µm) to about 1 mm). Portions of the infrared range, particularly portions in the far or thermal IR having wavelengths between about 0.1 and 1 mm, may alternatively, or in addition, be termed millimeter-wave (MMW) wavelengths.

Camera. An image sensor alone or in combination with input optics that transmit incident radiation to the sensor. A camera may be described according to the wavelength band that is detected, as determined by a combination of the spectral sensitivity of the sensor and the spectral selectivity, if any, of the input optics. Each camera may, for example, be a visible light camera that predominantly or exclusively detects visible light, an ultraviolet camera that predominantly or exclusively detects ultraviolet radiation, or an infrared camera that predominantly or exclusively detects infrared radiation. If an infrared camera, the camera may be a short-wave infrared camera that predominantly or exclusively detects SWIR, a mid-wave infrared camera that predominantly or exclusively detects MWIR, a long-wave infrared camera that predominantly or exclusively detects LWIR, or a combination thereof (e.g., an MWIR/LWIR camera), among others.

DETAILED DESCRIPTION

The present teachings relate to systems, including apparatus and methods, for obtaining and/or correcting images, particularly from turbulence-induced wavefront errors and distortions. Obtaining images, as used herein, may include optically forming a duplicate, counterpart, and/or other representative reproduction of an object or scene, especially using a mirror (reflective optic) and/or lens (refractive optic). The duplicate, counterpart, and/or reproduction, in turn, may be detected, in analog or digital formats, especially using analog (e.g., film) and/or digital (e.g., charge-coupled devices; focal plane arrays) recording mechanisms. Correcting images, as used herein, may include determining corrective information by analyzing image data in temporally separated image frames and/or in two or more wavelength regimes, identifying regions in the incoming image data that correspond to moving objects, and then removing turbulence-induced distortions to generate a corrected output image. Image correction according to the present teachings will typically by performed in real time or substantially in real time, although post-processing also may be performed using the present teachings.

The present teachings may involve the use of either a single multispectral sensor or multiple sensors sensitive to radiation in different wavelength regimes, as described in more detail below. In the case of multiple sensors, a first sensor may be sensitive to relatively shorter wavelengths, such as visible light, among others, and a second sensor may be sensitive to relatively longer wavelengths, such as infrared and/or millimeter-wave wavelengths, among others. Alternatively, the two sensors may be sensitive to different portions of the visible spectrum or different portions of the infrared spectrum. In addition, the present teachings may involve the use of a multispectral camera capable of sensing radiation in two or more wavelength regimes. For example, a multispectral camera suitable for use with the present teachings may be sensitive to two different portions of the infrared spectrum (such as medium-wave infrared radiation and long-wave infrared radiation), or to portions or the entirety of the visible light spectrum and/or the infrared radiation spectrum.

Various combinations of sensors are also contemplated by the present teachings. For example, a multispectral sensor may be configured to capture visible light in the red, green, and blue portions of the visible spectrum, and according to the present teachings, this sensor may be used either by itself or in conjunction with one or more sensors configured to capture a portion of the infrared spectrum, such as SWIR, MWIR, or LWIR radiation.

Regardless of how many sensors are used, the present teachings contemplate sensing image data in two or more wavelength regimes, and comparing the apparent motions (which may include linear or nonlinear motions) and/or first-order or tip/tilt phase distortions of objects within the images in the different wavelength regimes. Because apparent motions corresponding to distortion such as scintillation are expected to be dependent on wavelength, whereas apparent motions corresponding to actual object motions are expected to be independent of wavelength, this allows the distortion-induced apparent motions to be partially or entirely identified and removed from the image data, while preserving actual object or scene motion. More specifically, atmospheric distortions generally decrease as a function of increasing wavelength. This allows real object motion, relative to the sensors, to be estimated and separated from apparent object motion caused by atmospheric effects. Similarly, phase distortions are expected to be dependent on wavelength in a predictable manner. Accordingly, corrected images may be generated, corresponding substantially only to actual objects and object motions within the field of view of the sensor(s).

According to the present teachings, the wavelength dependence of distortion effects may be used in conjunction with any combination or sub-combination of the captured image data to identify and remove distortion. Furthermore, the distortion effects analyzed may include various effects, including wavelength-dependent translational distortion, wavelength-dependent rotational wavefront distortion (such as tip/tilt), and/or wavelength-dependent phase distortion. Any combination of distortion effects may be used to resolve and remove visible image distortions, even if the distortion effect(s) used to identify regions of distortion would not themselves be visible in the raw image data. A general mathematical description of the techniques contemplated by the present teachings is as follows.

A. Identifying Distortion-Induced Motion Directly

The present teachings contemplate identifying and removing scintillation-induced motion directly. In cases where motion is observed at two wavelengths, representing true object or scene motion by the symbol t, nominal scintillation motion by the symbol s, and measured motion by the symbol m, the motion measured at wavelengths $\lambda_1$ and $\lambda_2$ may be described by the equations:

$$m_1 = f(\lambda_1, s) + t \tag{1}$$

$$m_2 = f(\lambda_2, s) + t \tag{2}$$

where the function $f$ relates scintillation motion to wavelength. This set of equations provides two equations in the two unknowns s and t, and thus may be solved analytically (in some cases) or computationally for the scintillation motion s. In cases where motion is observed at three or more wavelengths, a least squares or other appropriate optimization method may be used to solve for the scintillation motion. In all cases, the incoming image data then may be corrected to remove the scintillation components $f(\lambda_1, s)$ from the image(s), leaving the true scene motion unaffected.

B. Identifying Image Distortion Through Phase Distortion

The present teachings also contemplate using image phase distortion observed in focused images at multiple wavelengths to identify and remove visible image distortion. The correction of images distorted by a medium, such as the Earth's atmosphere, and/or by various optical components of an imaging system, generally can be accomplished using the mathematical principle of deconvolution. This principle stems from the notion that, for an arbitrary three-dimensional object, an optical imaging system yields an image intensity distribution i(x,y,z) that is the convolution of the object intensity distribution o(x,y,z) with the point spread function (PSF) s(x,y,z) describing blurring of a theoretical point source of light:

$$i(x, y, z) = \int_{-\infty}^{\infty} dx' \int_{-\infty}^{\infty} dy' \int_{-\infty}^{\infty} dz' o(x', y', z') s(x-x', y-y', z-z') \equiv o(x, y, z) \otimes s(x, y, z) \text{ (3-D case)} \tag{3}$$

where $\otimes$ is called the convolution operator. The PSF describes how light is spread out or blurred by the medium and/or imaging system due to diffraction and other distortion effects as the light travels between the object and image. The same relationship applies for two-dimensional (i.e., planar) and one-dimensional (i.e., linear) objects, but the convolution equation takes simpler forms:

$$i(x, y) = \int_{-\infty}^{\infty} dx' \int_{-\infty}^{\infty} dy' o(x', y') s(x-x', y-y') \equiv o(x, y) \otimes s(x, y) \text{ (2-D case)} \tag{4}$$

$$i(x) = \int_{-\infty}^{\infty} dx' o(x') s(x-x') \equiv o(x) \otimes s(x) \text{ (1-D case)}. \tag{5}$$

For simplicity, in this disclosure, the spatial dependence hereinafter typically will be omitted from equations; e.g., the convolution operation will be written $$= o \otimes s, \tag{6}$$

without regard to the number of spatial dimensions (or the coordinate system used in their representation).

The goal of deconvolution is to extract an object intensity distribution function o, describing the actual distribution of intensity in an object, from the measured image intensity distribution function i, which may be degraded by environmental and/or instrumental factors, as described above. The convolution theorem of mathematics holds that the Fourier transform of the convolution of two functions is the ordinary product of the Fourier transforms of the functions, i.e., that $$\Gamma(f \otimes g) = \Gamma(f)\Gamma(g), \tag{7}$$

where $\Gamma$ is the Fourier transform operator, defined in one dimension (with suitable generalizations to greater numbers of dimensions) by $$\Gamma(f(x)) = F(\omega) = \frac{1}{\sqrt{2\pi}} \int_{-\infty}^{\infty} f(x) e^{-i\omega x} dx. \tag{8}$$

As a result of this mathematical simplification, deconvolution techniques often are performed in Fourier (or frequency) space. The Fourier transform of the PSF, i.e., $$\Gamma(s(x)) \equiv S(\omega), \tag{9}$$

is sometimes referred to as the optical transfer function (OTF).

The description above may be modified slightly for a discrete system, such as a detector array. In this case, Eq. (6) above can be expressed as follows:

$$i_k(x) = \sum_{x' \in \chi} o(x') s_k(x - x') \equiv o \otimes s_k(x) \tag{10}$$

where o is again the object intensity distribution, $s_k$ is a PSF having diversity k, $i_k$ is the kth diversity image, and x is a spatial coordinate. If the object, the PSFs, and the images are considered to be arrays of size N×N, then the domain of Eq. (10) is described by the set $$\chi = \{0, 1, \ldots, N-1\} \times \{0, 1, \ldots, N-1\}. \tag{11}$$

Wavelength-dependent phase diversity can be introduced by considering the impulse-response function h(x) and its Fourier transform, where h(x) is related to the real portion of the point spread function s(x):

$$s_k(x) \equiv |h_k(x)|^2. \tag{12}$$

The Fourier transform of the complex function h(x) is known as the generalized pupil function, and is related to h(x) in the usual way, i.e., $$\Gamma(h(x)) = H(\omega) = \frac{1}{\sqrt{2\pi}} \int_{-\infty}^{\infty} h(x) e^{-i\omega x} dx, \tag{13}$$

$$\Gamma^{-1}(H(\omega)) = h(x) = \frac{1}{\sqrt{2\pi}} \int_{-\infty}^{\infty} H(\omega) e^{i\omega x} dx. \tag{14}$$

In the case of a discrete system, Eq. (14) may be rewritten as:

$$h_k(x) = \frac{1}{N^2} \sum_{u \in \chi} H_k(u) \exp(i 2\pi \langle u, x \rangle / N), . \tag{15}$$

where ⟨u,x⟩ represents an inner product. The complex generalized pupil function H may be expressed in terms of wavelength-dependent and wavelength-independent phase components as follows:

$$H_k(x) = |H_k(x)|\exp\left[-i2\pi\sum_j \left(\frac{\omega_j}{\lambda_k} + \phi_j\right)Z_j\right] \quad (16)$$

where $\omega/\lambda_k$ is the wavelength-dependent portion of the phase, $\phi$ is the wavelength-independent portion of the phase, and $Z_j$ is the Zernike basis polynomial of index j. In other words, the angular portion $D_k$ of the complex image $H_k(x)$ can be viewed as the phase distortion at each wavelength, and may be represented by a sum of weighted Zernike basis functions Z:

$$D_k = \exp\left[-i2\pi\sum_j \left(\frac{\omega_j}{\lambda_k} + \phi_j\right)Z_j\right]. \quad (17)$$

One reason to express $D_k$ in terms of Zernike basis functions is that, in the Zernike polynomial basis, turbulence is associated primarily with the low-order basis functions. Specifically, tip/tilt (scintillation) is associated with the first-order Zernike polynomials (in cylindrical coordinates) $Z=2\rho \sin\theta$, $2\rho\cos\theta$, whereas defocus (blurring) is associated with the second-order Zernike polynomial $Z=\sqrt{3}(2\rho^2-1)$. Accordingly, if the corresponding Zernike coefficients can be found, then the non-wavelength-dependent distortions $\phi_j$ of the complex image can be removed from the corrections at the end of optimization to recover the scene $o_k(x)$ for each waveband $\lambda_k$.

For example, image defocus (blurring) can be determined from two simultaneously captured phase diverse images if one image is captured with an intentionally induced phase distortion, which is typically a known amount of defocus. This corresponds to determining the second-order Zernike polynomial in Eq. (17) above. Further details of methods for correcting image blurring in this manner are described in Waxman et al., *Joint Estimation of Object and Aberrations by Using Phase Diversity*, 9 J. Opt. Soc. Am. A, pp. 1072-1085 (July, 1992) and in U.S. Pat. No. 7,515,767 to Miller et al. Both of these references are hereby incorporated by reference, in their entireties, into the present disclosure.

According to the present teachings, two or more images also may be captured at the same time, but at different wavelengths or in different wavelength regimes. However, the present teachings do not involve intentionally blurring any of the images to determine overall image defocus, but rather contemplate capturing all of the images in focus. Each captured, focused image can be separately analyzed to determine the angular portion $D_k$ of the corresponding complex generalized pupil function $H_k(x)$, defined above in Eq. (17). Then, using a known or assumed relationship between wavelength and expected phase distortion, Eq. (17) may be solved for the corresponding first-order Zernike function, to determine tip/tilt distortion. This process can be viewed as simultaneously solving multiple versions of Eq. (17) at two more wavelengths, to determine the first-order Zernike function contribution to Eq. (17) at each different wavelength.

The method described above is distinct from prior art deconvolution methods, such as the methods of Waxman et al. and Miller et al. mentioned previously, because those prior art methods capture identical tip/tilt distortions in each phase diverse image, and thus provide no basis for separating this type of distortion from the true scene image. By capturing focused images at different wavelengths, the present teachings capture a different amount of tip/tilt distortion in the different images, and thus allow tip/tilt distortion (and therefore scintillation distortion) to be estimated and separated from the captured images.

C. Support Platforms

Image correction systems according to aspects of the present disclosure may include a turret unit supported by a support platform. A support platform, as used herein, generally refers to any mechanism for holding, bearing, and/or presenting a turret unit and its payload. The support platform may be moving, movable but stationary, or fixed in relation to the earth, and may be disposed on the ground, in the air or space, or on and/or in water, among others. In any case, the support platform may be selected to complement the function of the turret unit and particularly its payload.

The support platform may be movable, such as a vehicle with or without motive power. Exemplary vehicles include a ground vehicle (e.g., a car, truck, motorcycle, tank, etc.), a watercraft (e.g., a boat, submarine, carrier, etc.), an aircraft or airborne device (e.g., a fixed-wing piloted aircraft, pilotless remote-controlled aircraft, helicopter, drone, missile, dirigible, aerostat balloon, rocket, etc.), or the like.

The support platform may be fixed in position. Exemplary fixed support platforms may include a building, an observation tower, a fence, and/or an observation platform, among others. In some embodiments, the support platform may be a temporarily stationary movable support, such as a hovering helicopter and/or a parked car, truck, or motorcycle, among others.

A gimbal system with a moving, temporarily stationary, or fixed support platform may be used for any suitable application(s). Exemplary applications for a gimbal system include navigation, targeting, search and rescue, law enforcement, firefighting, force protection, and/or surveillance, among others.

D. Examples

The examples below provide additional details of specific embodiments of this general approach to image correction. These examples are intended for illustration only, and are not intended to limit or define the entire scope of the present teachings.

Example 1

Determination of Distortion Using Multiple Sensors

This example describes exemplary systems and methods for the direct determination of motion with multiple sensors; see FIGS. 1 and 2.

FIG. 1 depicts a first exemplary embodiment of an image correction system, generally indicated at 10, according to aspects of the present teachings. System 10 includes two sensors 12, 14, which are collectively capable of sensing image data in two separate wavelength regimes or wavebands. System 10 also includes a processor 15 that receives image data collected by sensors 12, 14 and performs an image correction function according to the present teachings. The process may include or employ first, second, and third processor functionalities 16, 18, 20, among other suitable configurations, for performing the image correction function. System 10 further may include a display and/or other output device 22 configured to display and/or otherwise make use of a corrected image, sequence of images, and/or video stream.

Sensors 12, 14 will typically be digital cameras of some type, suitable for sensing and collecting image data in two or more wavelength regimes, or at least at a first wavelength and a second wavelength. Accordingly, sensors 12, 14 each may include a focal plane array sensitive to radiation in one or more particular wavelength regimes. For example, sensor 12 may be sensitive to visible light (such as red, green, and/or blue visible light), and sensor 14 may be sensitive to radiation within a portion of the infrared spectrum, such as near infrared radiation (NIR), short wavelength infrared radiation (SWIR), medium wavelength infrared radiation (MWIR), and/or long wavelength infrared radiation (LWIR). Alternatively, sensor 12 may be sensitive to radiation within a first portion of the infrared spectrum, and sensor 14 may be sensitive to radiation within a second portion of the infrared spectrum. In this case, various combinations of sensitivities are possible for sensors 12 and 14 respectively, such as MWIR and LWIR, SWIR and MWIR, SWIR and LWIR, NIR and SWIR, NIR and MWIR, or NIR and LWIR. Any such combination is contemplated by the present teachings.

System 10 optionally may include a beamsplitter (not shown) configured to separate image data received within a particular field of view into two signal components having appropriate wavelength ranges and to direct the signal components toward sensors 12 and 14, respectively. Beamsplitters of this type generally comprise optical devices configured to separate electromagnetic radiation into different wavelength bands, for example, separating a visible light band from an infrared radiation band, among other possibilities. Suitable beamsplitters (such as dichroic or multi-dichroic beamsplitters) may operate by any suitable mechanism, such as by transmitting one wavelength band while reflecting another wavelength band, and/or by deflecting or diffracting one wavelength band to a different extent than another wavelength band. Suitable beamsplitters may include prismatic materials, such as fused silica or quartz, and may be coated with a metallic or dielectric layer having wavelength-dependent transmission and reflection properties. Alternatively or in addition, suitable beamsplitters may include diffractive materials or devices, such as an acousto-optic modulator. In the present example, a suitable beamsplitter might be configured to direct substantially visible light toward sensor 12, and to direct substantially infrared light toward sensor 14. Using a beamsplitter in this manner ensures that each sensor receives image data from precisely the same field of view.

In the absence of a beamsplitter, each sensor 12, 14 will generally receive image data including a similar range of wavelengths, but from a slightly different field of view due to the different positions of the sensors. In that case, the images received by the sensors may be aligned to a common reference before subsequent processing, so that objects have the same size and appear at the same pixel location in each image. Suitable filters may be used to limit, or further limit, the wavelength(s) received by each sensor, particularly (but not necessarily only) in embodiments without a beamsplitter.

Processor 15 generally comprises any mechanism(s) for correcting images, particularly from scintillation and/or other turbulence-induced distortions. Processor 15 is presented here in terms of three processor functionalities 16, 18, and 20. These functionalities may be performed by a single processor, description of three separate processors is merely exemplary, because in some cases the processing operations performed by the various processors may be combined or further separated, in which case the operations may be performed by more or fewer than three separate processors. Furthermore, although the present example focuses primarily on directly determining and removing wavelength-dependent apparent motions, other wavelength-dependent features, such as phase distortion, may be determined and used to identify and remove portions of the incoming image data attributable to distortion.

In the present example, first processor functionality 16 is configured to receive image data collected by sensors 12 and 14, and to measure apparent frame-to-frame motions between successive image frames captured by the sensors. Accordingly, processor functionality 16 may be referred to as a motion estimator processor. Various motion estimation techniques are known and may be used in conjunction with motion estimator processor functionality 16 to determine the apparent motions. Known techniques for estimating motions between successive image frames include various optical flow formulations described, for example, in (A) M. Black and P. Anandan, *The Robust Estimation of Multiple Motions: Parametric and Piecewise-smooth flow fields*, Computer Vision and Image Understanding, Vol. 63, No 1, pp. 75-104, 1996, (B) G. Sullivan and R. Baker, *Motion compensation for video compression using control grid interpolation*, Proceedings of the IEEE Acoustics, Speech, and Signal Processing conference, Vol. 4, pp. 2713-2716, 1991; and (C) B. Lucas and T. Kanade, *An iterative image registration technique with an application to stereo vision*, Proceedings of Image Understanding Workshop, pp. 121-130, 1981. These references are hereby incorporated by reference into the present disclosure for all purposes. The output of motion estimator processor functionality 16 is an apparent motion map that specifies the horizontal and vertical motion of each pixel in the frame relative to a previous frame. The previous frame may be either the frame acquired immediately preceding the current frame, or one acquired some number of frames earlier.

In the context of output of motion estimator processor functionality 16, the term "apparent motion map" refers simply to a dimensionally organized set of data representing information about apparent motions between the frames. The data of the apparent motion map may be multidimensional, so that it contains information corresponding to each portion of the multidimensional image data. For example, in a simple case the apparent motion map may include a set of x,y motion vectors corresponding to the frame-to-frame motion of each pixel of the image frame.

Alternatively, the apparent motion map may include a set of vectors containing the weights corresponding to a representation of phase distortion in some suitable basis of orthogonal polynomials, such as the Zernike polynomial basis or the pseudo-Zernike polynomial basis. In this case, the output of first processor functionality 16 might be referred to as one or more "phase distortion maps." More generally, the output of the first processor functionality might simply be referred to as "image characteristic maps" (or "image characteristic change maps"), indicating the fact that the processor is configured to generate output containing information about both actual scene content and also wavelength-dependent information that may be used to separate distortion from the actual scene content. Accordingly, in some cases the apparent motion map generated by motion estimator processor functionality 16 may contain equations, or at least coefficients for one or more equations. Furthermore, the apparent motion map need not have the same size as the image; the apparent motion map grid can be larger, smaller, or the same size as the pixel grid. At one extreme, the apparent motion map can even be a single global value, vector, or equation, which characterizes the apparent motion(s) determined by the motion estimator processor functionality.

As indicated in FIG. 1, the output of motion estimator processor functionality 16 corresponding to each sensor 12, 14 is input to a second processor functionality 18, which in some cases may be referred to as a motion classifier processor functionality. Motion classifier processor functionality 18 incorporates information about the relative distortion expected in each waveband to identify regions in the images that correspond to objects that are actually moving relative to the sensors. This generally may be accomplished because distortion-induced apparent motion is typically wavelength dependent in a predictable manner, whereas actual object motion is typically wavelength independent. Therefore, apparent motions that differ in the different wavelength regimes sensed by sensors 12 and 14 can be attributed to distortion-induced apparent motion, whereas apparent motions that are the same in the different wavelength regimes sensed by sensors 12 and 14 can be attributed to actual object motion.

Any form of motion classifier algorithm with adequate performance can be used in conjunction with motion classifier processor functionality 18, including simple threshold classifiers, hypothesis testing, Bayesian classifiers, and neural networks, all of which are known in the art. Because motion classifier functionality processor 18 is programmed to incorporate waveband distortion information, processor functionality 18 is configured to distinguish distortion-induced motion from actual object motion in the apparent motion map. As described previously, in some cases this may be accomplished by distinguishing wavelength-dependent motions from wavelength-independent motions in the visible portion of the captured images. In other cases, distortion-induced motion may be distinguished from actual motion by distinguishing wavelength-dependent phase distortions from wavelength-independent phase distortions in the generalized pupil function corresponding to each image, and then determining (for example) the phase contributions corresponding to scintillation. This allows scintillation-induced motions to be identified and separated from the captured image data.

In any case, the output of motion classifier processor functionality 18 may be referred to as one or more moving object maps. Each moving object map indicates the location and actual motion of moving objects in the scene, relative to the sensors, corresponding to image data collected at a particular wavelength or within a particular wavelength regime. Accordingly, the moving object map(s) may take any suitable form, such as a set of vectors specifying the motions of objects corresponding to each image pixel, the boundaries and common motions (including translation and rotation) of rigid bodies, and/or the like.

The input frame, apparent motion map, and moving object map are input to a third processor functionality 20 that generates corrected image output, and which accordingly may be referred to as an image correction processor functionality. Image correction processor functionality 20 is configured to remove the distortion-induced apparent motion from the incoming image data, and to generate one or more corrected output images. For example, processor functionality 20 may be configured to generate a first set of corrected image data by removing apparent motions caused by wavelength-dependent distortion from the image data collected in the first wavelength regime, and/or to generate a second set of corrected image data by removing apparent motions caused by wavelength-dependent distortion from the image data collected in the second wavelength regime. Furthermore, in some cases the distortion effects determined by analyzing any portion of the collected image data may be extrapolated to other wavelength regimes and used to estimate and remove distortion effects from those other regimes.

The corrected image(s) may be generated using any suitable technique, such as warping, quality-based fusion, or super-resolution methods. In any case, the image correction processor functionality is configured to generate images that do not include the portions of the sensed apparent motions attributable to distortion. Accordingly, image correction processor functionality 20 may generate corrected image data such as a clear video stream or a sequence of super-resolution stills.

The corrected image data output by image correction processor functionality 20 may be recorded and/or transmitted to a display device 22. Display device 22 is configured to display corrected images, sequences of images, and/or video streams to a user, and may take any suitable form for doing so. For example, display device 22 may be a dedicated monitor such as an LCD or LED monitor, a heads-up display viewable by a pilot or other vehicle, a helmet mounted display, and/or the like. Because the processing performed by motion estimator processor functionality 16, motion classifier processor functionality 18, and image correction processor functionality 20 requires analysis of only two image frames, corrected image data may be provided in real time or near real time. Furthermore, as noted previously, although three separate processor functionalities and processing steps have been described, in some cases the functions of those processor functionalities may be combined into one or two processor functionalities, and/or the processing steps may be combined into a single, more comprehensive image correction algorithm.

FIG. 2 is a flowchart depicting a method of image correction, generally indicated at 50, which is suitable for use with image correction system 10.

At steps 52, 52', image data are received and captured by two separate sensors. As described previously, each sensor may receive all wavelengths of the incoming image data, or the incoming image data may be split by a beamsplitter so that each sensor receives only a suitable range of wavelengths of the incoming image data. Each of the image sensors will typically be configured to capture images digitally, and accordingly will include one or more charge-coupled devices (CODs), focal plane arrays (FPAs), or the like. The image data may be collected at a plurality of times corresponding to different image frames, so that frame-to-frame apparent motions may be analyzed, for example, by calculating optical flow corresponding to image data collected at each wavelength (or within each wavelength regime) at a plurality of times.

At steps 54, 54', the images captured by the sensors are aligned, for example, to a common reference frame, so that objects have the same size and appear at the same pixel location in each image. If a beamsplitter is used to direct the incoming image data from a single field of view to the sensors, then steps 54, 54' may be omitted. Similarly, steps 54, 54' may be omitted if the incoming image data are already sufficiently aligned, for instance, in the case of sufficiently distant objects.

At steps 56, 56', the captured images are compared to previously captured images, and the apparent motions and/or phase distortions signified by changes from one image frame to the next are determined.

At steps 58, 58', the frame-to-frame apparent motions and/or phase distortions are processed into an apparent motion map for each captured image.

At steps 60, 60', the apparent motion maps are analyzed, based on expected differences in distortion in different wavelength regimes, to determine which components of the apparent motion maps are attributable to distortion and which are attributable to actual object motions. As described previously, this may be accomplished either by directly identifying wavelength-dependent motions in the captured images, or by determining the wavelength-dependent portion of the phase of the generalized pupil function corresponding to each image, and using this information to identify image contributions attributable to scintillation distortion.

At step 62, a moving object map is created. The moving object map contains information regarding actual frame-to-frame object motions, with apparent motions and corresponding phase distortions removed to the extent possible.

At steps 64, 64', the moving object map is used, in conjunction with the apparent motion map and the input image frame corresponding to each wavelength regime, to generate a corrected output image in one or more of the senses wavelength regimes.

At steps 66, 66', one or more corrected output images are displayed on a display device, either as still images or as a corrected video stream. Because corrected images corresponding to a given input image frame are generated using only one or more frames of previously collected image data, the corrected images may be generated substantially in real time.

Example 2

Determination of Distortion Using a Single Sensor

This example describes exemplary systems and methods for the direct determination of motion with a single sensor; see FIGS. 3 and 4.

FIG. 3 depicts a second exemplary embodiment of an image correction system, generally indicated at 110, according to aspects of the present teachings. System 110 includes a single sensor 112, which is capable of sensing image data in a sufficient range of wavelengths so that the wavelength dependence of distortion-induced apparent motions may be observed and analyzed to a desired extent. System 110 further includes a processor 115, including a first processor functionality 116, a second processor functionality 118, and a third processor functionality 120. System 110 also may include a display and/or other output device 122 configured to display and/or otherwise make use of processed image data.

Sensor 112 may, for example, be a multispectral camera, such as a dual-band MWIR/LWIR camera where the two bands are stacked on a single focal plane; a single focal plane dual-band camera sensitive to any two wavelengths or wavelength regimes; a camera having a multispectral filter such as a Bayer or Bayer-like filter directly on the focal plane; or a camera having a multispectral filter such as a filter wheel in front of the camera. Specific examples of suitable multispectral imaging devices include single focal plane arrays sensitive to multiple independent wavelength regimes, such as MWIR and LWIR Mercury Cadmium Telluride (HgCdTe) focal plane arrays and quantum well infrared photodetector (QWIP) focal plane arrays. Each of these sensors has the ability to simultaneously sense registered light in both the MWIR regime and the LWIR regime. Additionally, dual band and triple band arrays have been manufactured from superlattice structures and nanotech structures. Like dual band HgCdTe sensors, these arrays can be used to sense light simultaneously in different colors while registered. Because the atmospheric effects will be different between the bands to which these focal plane arrays are sensitive, and because the arrays sense the light simultaneously (or at least on a shorter time scale than significant changes in the atmosphere), information about the atmospheric effects can be determined.

Sensor 112 may, in some cases, be simply a three color visible light camera, capable of sensing at least portions of the red, green, and blue parts of the visible light spectrum. In that case, some degree of atmospheric image distortion may be removed by analyzing the wavelength dependence of the apparent motions and/or phase distortions sensed at various wavelengths within the visible spectrum. For some applications, this may provide sufficient image correction and/or a degree of image correction comparable to systems utilizing more than one sensor. More generally, sensor 112 may have sensitivity across any suitable discrete or continuous wavelength range(s). Because atmospheric image distortions are wavelength dependent, sensing image data in essentially any finite range of wavelengths may be used according to the present teachings to correct images to some degree.

Processor 115, first processor functionality 116, second processor functionality 118, and third processor functionality 120 are substantially similar to their counterparts in multi-sensor system 10, and accordingly will not be described further in this example. Processor 15, as in the case of system 10, may comprise a single processor, capable of performing each functionality, or two or more discrete processors dedicated to performing a subset of the functionalities. Any desired number of processors may be used.

Two distinctions, however, between systems 10 and 110 follow from the use of one rather than two or more sensors. First, no image alignment is needed in system 110 to register images, because multispectral sensor 112 necessarily receives image data along a single line of sight, and therefore automatically produces aligned images. Second, the image data received by sensor 112 in different wavelength regimes will generally be separated before processing, so that wavelength-dependent artifacts may be identified. In some cases, such as when a Bayer-type filter is used, the raw incoming image data may be automatically separated into different wavelength ranges, such as the red, green, and blue visible light regimes, and therefore may be transmitted to the motion estimator processor functionality in substantially its received form. In other cases, it may be desirable to filter or otherwise pre-process the raw image data to separate it into appropriate wavelength ranges before transmission to the motion estimator processor functionality, or to configure the motion estimator processor functionality itself to perform suitable pre-processing before determining apparent frame-to-frame motions.

System 110, aside from the distinctions noted above, is configured to function in a manner similar to system 10. More specifically, multispectral image data are transmitted to first processor functionality 116, which determines apparent frame-to-frame motions for images generated from image data in at least two distinct wavelength ranges. In this case, processor functionality 116 may be referred to as a "motion estimation processor functionality." Alternatively or in addition to determining apparent frame-to-frame motions, processor functionality 116 may determine phase distortions captured at each wavelength or subset of wavelengths collected by sensor 112, in which case processor functionality 116 may be referred to as a "phase distortion processor functionality." In any case, the output of processor functionality 116 corresponding to each wavelength range is an image characteristic map for each wavelength regime, which is input to second processor functionality 118. Processor functionality 118 uses these image characteristic maps to identify regions in one or more images that correspond to objects that are actually moving relative to sensor 112. Accordingly, processor functionality 118 may be referred to as a "motion classifier processor functionality." The input image data, the apparent motion map generated by processor functionality 116, and the moving object map generated by processor functionality 118, are all input to third processor functionality 120, which generates corrected images. Accordingly, processor functionality 120 may be referred to as an "image correction processor functionality." The corrected images may be recorded and/or transmitted to display (or other output) device 122.

FIG. 4 is a flowchart depicting an exemplary method of image correction, generally indicated at 150, which is suitable for use with image correction system 110.

At step 152, image data are received and captured by a single multispectral image sensor. As described previously, the image sensor will typically be configured to capture images digitally, and accordingly will include one or more charge-coupled devices (CODs), focal plane arrays (FPAs), or the like. The image sensor will be of a type capable of capturing image data across a range of wavelengths, such as two or more separate wavelength regimes, or a single continuous wavelength regime. Properties of suitable image sensors are described above with respect to sensor 112 depicted in FIG. 3.

At step 154, the captured image data are divided into two or more separated signals corresponding to different wavelength regimes. As described previously with respect to system 110 of FIG. 3, the raw image data captured by a single multispectral sensor already may be separated into wavelength regimes or subsets of wavelengths, in which case little or no additional processing may be necessary to separate the data into component images. In some cases, however, the raw image data may include combined data captured over a continuous range of wavelengths, in which case step 154 may include additional processing to separate the raw data into two or more signals corresponding to different desired wavelength regimes.

The remaining steps of method 150 are substantially similar to the corresponding steps of method 50. Specifically, at steps 156, 156', the captured image data corresponding to the desired wavelength regimes are compared to previously captured image data in the same wavelength regimes, and the apparent motions and/or phase distortions signified by changes from one image frame to the next are determined. At steps 158, 158', the frame-to-frame apparent motions and/or phase distortions are processed into an apparent motion map and/or phase distortion map (which more generally may be referred to as an image characteristic map) for each captured image. At steps 160, 160', the image characteristic maps are analyzed, based on expected differences in image characteristics in different wavelength regimes, to determine which components of the image characteristic maps are attributable to distortion and which are attributable to actual scene content. At step 162, one or more moving object maps are created. Each moving object map contains information regarding actual frame-to-frame object motions in a particular wavelength regime or subset, with apparent motions and/or phase distortions removed to at least some degree. At steps 164, 164', the moving object map(s) are used, in conjunction with the associated image characteristic maps and the input image frame corresponding to one or more of the wavelength regimes, to generate a corrected output image in each desired wavelength regime. At steps 166, 166', the corrected output images are displayed on a display device, either as still images or as a corrected video stream. For the reasons described previously, the corrected images may be generated substantially in real time.

Example 3

Moving Support Platform

This example describes exemplary support platforms; see FIG. 5.

FIG. 5 depicts a helicopter 200 as an exemplary embodiment of a moving platform that might be used to support imaging systems according to the present teachings, and/or to practice methods of image correction according to the present teachings. Specifically, helicopter 200 includes a rotatable gimbal 202, within which may be disposed one or more sensors such as those described previously, including visible light and/or infrared sensors configured to collect light within various desired wavelength regimes. Also within gimbal 202, or otherwise mounted to helicopter 200, suitable processors may be disposed and configured to carry out the various image processing steps described above. Alternatively, one or more processors may be disposed at a remote location and configured to carry out some or all of the image processing steps contemplated by the present teachings. A display device such as a monitor or heads-up display may be disposed with helicopter 200 and configured to display images corrected according to the present teachings. Alternatively or in addition, a display device configured to display corrected images may be disposed in a remote location, such as within a ground-based command center. Additional details of gimbal systems and support platforms that may be suitable for use in conjunction with the present teachings may be found, for example, in U.S. patent application Ser. No. 13/009,753, filed Jan. 19, 2011, which is hereby incorporated by reference into the present disclosure for all purposes.

Example 4

Selected Embodiments

This example describes selected embodiments and aspects of the present disclosure as a series of indexed paragraphs.

A. A method of image correction, comprising (1) collecting image data in a range of wavelengths that includes at least a first wavelength and a second wavelength; (2) processing the image data to determine a first image characteristic map from image data collected at the first wavelength and a second image characteristic map from image data collected at the second wavelength; (3) processing the first and second image characteristic maps to distinguish changes caused by wavelength-dependent distortion from changes caused by object motion; (4) generating a first set of corrected image data by removing changes caused by wavelength-dependent distortion from the collected image data; and (5) generating a first corrected image from the first set of corrected image data.

A1. The method of paragraph A, wherein the image characteristic map is an apparent motion map.

A2. The method of paragraph A, wherein the changes caused by wavelength-dependent distortion comprise apparent image motions, and wherein the step of generating a first set of corrected image data includes removing the apparent image motions from the collected image data while retaining real object motion.

A3. The method of paragraph A, wherein the wavelength-dependent distortion includes tip/tilt distortion, and wherein the image characteristic map is a phase distortion map.

A4. The method of paragraph A, further comprising (1) generating a second set of corrected image data by removing changes caused by wavelength-dependent distortion from the collected image data; and (2) generating a second corrected image from the second set of corrected image data.

A5. The method of paragraph A, the range of wavelengths including at least a third wavelength, further comprising (1') processing the image data to determine a third image characteristic map from image data collected at the third wavelength; and (2') processing the third image characteristic map, in conjunction with processing the first and second apparent motion maps, to further distinguish changes caused by wavelength-dependent distortion from changes caused by object motion.

A6. The method of paragraph A, wherein the step of collecting image data includes collecting image data at a plurality of times corresponding to different image frames.

A7. The method of paragraph A6, wherein the first image characteristic map is determined by calculating optical flow corresponding to image data collected at the first wavelength at the plurality of times, and wherein the second image characteristic map is determined by calculating optical flow corresponding to image data collected at the second wavelength at the plurality of times.

A8. The method of paragraph A, wherein the first and second wavelengths are selected from the following combinations: two infrared wavelengths (e.g., MWIR and LWIR), visible and infrared wavelengths (e.g., visible and SWIR, visible and LWIR, and visible and MWIR), and two or more visible wavelengths.

A9. The method of paragraph A, wherein the first wavelength falls within the visible light spectrum and the second wavelength falls within the infrared radiation spectrum, and wherein collecting image data in a range of wavelengths includes collecting image data at the first wavelength with a visible light sensor and collecting image data at the second wavelength with an infrared radiation sensor.

A10. The method of paragraph A, wherein processing the first and second image characteristic maps includes comparing differences in the first and second image characteristic maps with distortion differences expected between image data collected at the first and second wavelengths.

A11. The method of paragraph A, further comprising generating a first moving object map corresponding to image data collected at the first wavelength and attributable to object motion, wherein the step of generating the first set of corrected image data includes comparing the first moving object map to the first image characteristic map.

A12. The method of paragraph A11, further comprising (1) generating a second moving object map corresponding to image data collected at the second wavelength and attributable to object motion; (2) generating a second set of corrected image data by comparing the second moving object map to the second image characteristic map; and (3) generating a second corrected image from the second set of corrected image data.

A13. The method of paragraph A, further comprising providing at least one image-collecting device and a processor, wherein the step of collecting image data is performed using the at least one image-collecting device, and wherein the step of processing is performed using the processor.

A14. The method of paragraph A, wherein the image characteristic maps are phase distortion maps, and wherein the step of processing the first and second image characteristic maps includes processing the first and second phase distortion maps to distinguish apparent image motions caused by tip/tilt distortion from apparent image motions caused by object motion by estimating the first-order Zernike polynomial in the generalized pupil function corresponding to the image data collected in each subset of wavelengths.

B. A method of image correction, comprising (1) collecting image data in a range of wavelengths that includes at least a first wavelength and a second wavelength; (2) processing the image data to determine a first apparent motion map from image data collected at the first wavelength and a second apparent motion map from image data collected at the second wavelength; (3) processing the first and second apparent motion maps to distinguish apparent motions caused by wavelength-dependent distortion from apparent motions caused by object motion; (4) generating a first set of corrected image data by removing apparent motions caused by wavelength-dependent distortion from the collected image data; and (5) generating a first corrected image from the first set of corrected image data.

B1. The method of paragraph B, wherein collecting image data in a range of wavelengths includes collecting at least red, green, and blue visible light.

B2. The method of paragraph B1, wherein the first wavelength is a portion of the red visible light spectrum and the second wavelength is a portion of the green visible light spectrum, and further comprising (1') processing the image data to determine a third apparent motion map from image data collected at a third wavelength that is a portion of the blue visible light spectrum; and (2') processing the third apparent motion map in conjunction with processing the first and second apparent motion maps, to further distinguish apparent motions caused by wavelength-dependent distortion from apparent motions caused by object motion.

B3. The method of paragraph B, wherein collecting the image data includes collecting image data at a plurality of times corresponding to different image frames.

B4. The method of paragraph B3, wherein the first apparent motion map is determined by calculating optical flow corresponding to image data collected at the first wavelength at the plurality of times, and wherein the second apparent motion map is determined by calculating optical flow corresponding to image data collected at the second wavelength at the plurality of times.

B5. The method of paragraph B, wherein the first wavelength falls within the visible light spectrum and the second wavelength falls within the infrared radiation spectrum, and wherein collecting image data in a range of wavelengths includes collecting image data at the first wavelength with a visible light sensor and collecting image data at the second wavelength with an infrared radiation sensor.

B6. The method of paragraph B, wherein processing the first and second apparent motion maps includes comparing differences in the first and second apparent motion maps with distortion differences expected between image data collected at the first and second wavelengths.

B7. The method of paragraph B, further comprising generating a first moving object map corresponding to image data collected at the first wavelength and attributable to object motion, and wherein generating the first set of corrected image data includes comparing the first moving object map to the first apparent motion map.

B8. The method of paragraph B7, further comprising (1') generating a second moving object map corresponding to image data collected at the second wavelength and attributable to object motion; (2') generating a second set of corrected image data by comparing the second moving object map to the second apparent motion map; and (3') generating a second corrected image from the second set of corrected image data.

B9. The method of paragraphs B-B8, further comprising providing at least one image-collecting device and a processor, wherein the step of collecting image data is performed using the at least one image-collecting device, and wherein the step of processing is performed using the processor.

C. A method of image correction, comprising (1) collecting image data in a range of wavelengths that includes at least a first subset of wavelengths and a second subset of wavelengths; (2) processing the image data to determine a first phase distortion map from image data collected in the first subset of wavelengths and a second phase distortion map from image data collected in the second subset of wavelengths; (3) processing the first and second phase distortion maps to distinguish apparent image motions caused by tip/tilt distortion from apparent image motions caused by object motion; (4) generating a first set of corrected image data by removing apparent image motions caused by tip/tilt distortion from the collected image data; and (5) generating a first corrected image from the first set of corrected image data.

C1. The method of paragraph C, wherein collecting image data in a range of wavelengths includes collecting at least red, green, and blue visible light with a visible light sensor.

C2. The method of paragraph C1, wherein the first subset of wavelengths includes red visible light and the second subset of wavelengths includes green visible light, and further comprising (1') processing the image data to determine a third phase distortion map from image data collected in a third subset of wavelengths that includes blue visible light; and (2') processing the third phase distortion map in conjunction with processing the first and second phase distortion maps, to further distinguish apparent image apparent image motions caused by tip/tilt distortion from apparent image motions caused by object motion.

C3. The method of paragraph C, wherein collecting the image data includes collecting image data in each subset of wavelengths at a plurality of times.

C4. The method of paragraph C, wherein the first subset of wavelengths includes at least a portion of the visible light spectrum and the second subset of wavelengths includes at least a portion of the infrared radiation spectrum, and wherein collecting image data in a range of wavelengths includes collecting image data in the first subset of wavelengths with a visible light sensor and collecting image data in the second subset of wavelengths with an infrared radiation sensor.

C5. The method of paragraph C, wherein processing the first and second phase distortion maps to distinguish apparent image motions caused by tip/tilt distortion from apparent image motions caused by object motion includes estimating the first-order Zernike polynomial in the generalized pupil function corresponding to the image data collected in each subset of wavelengths.

C6. The method of paragraphs C-C5, further comprising at least one image-collecting device and a processor, whether the step of collecting image data is performed using the at least one imaging device, and wherein the step of processing is performed using the processor.

D. An image correction system, comprising (1) image-collecting apparatus configured to collect a first set of image data in a first wavelength regime and a second set of image data in a second wavelength regime; and (2) a processor configured to perform first, second, and third processor functionalities; wherein the first processor functionality involves determining a first image characteristic map from the first set of image data and a second image characteristic map from the second set of image data; wherein the second processor functionality involves analyzing the first and second image characteristic maps to identify collected image data caused by common path distortion; and wherein the third processor functionality involves generating a first set of corrected image data by removing common path distortion from the first set of image data, and generating a first corrected image signal from the first set of corrected image data.

D1. The system of paragraph D, wherein the image characteristic maps determined by the first processor functionality are apparent image motion maps containing information about apparent frame-to-frame motions within the collected image data.

D2. The system of paragraph D1, wherein the first processor functionality is configured to determine the first apparent image motion map by calculating optical flow corresponding to the first set of image data, and to determine the second apparent image motion map by calculating optical flow corresponding to the second set of image data.

D3. The system of paragraph D, wherein the image characteristic maps determined by the first processor functionality are phase distortion maps containing information about phase distortions, including tip/tilt distortions within the collected image data.

D4. The system of paragraph D3, wherein the second processor functionality is configured to analyze the phase distortion maps by estimating the first-order Zernike polynomial of the generalized pupil function corresponding to the image data collected in each wavelength regime.

D5. The system of paragraph D, wherein the image-collecting apparatus includes a visible light sensor configured to collect light of at least two distinct colors, wherein the first wavelength regime corresponds to the first color, and wherein the second wavelength regime corresponds to the second color.

D6. The system of paragraph D, wherein the image-collecting apparatus includes a visible light sensor configured to collect the first set of image data, and an infrared sensor configured to collect the second set of image data.

D7. The system of paragraph D, wherein the image-collecting apparatus includes first infrared sensor configured to collect the first set of image data in the first wavelength regime, and a second infrared sensor configured to collect the second set of image data in the second wavelength regime.

D8. The system of paragraph D7, wherein the first infrared sensor is configured to collect MWIR radiation and the second infrared sensor is configured to collect LWIR radiation.

D9. The system of paragraph D, wherein the image-collecting apparatus includes a dual-band sensor configured to collect the first set of image data in the first wavelength regime and the second set of image data in the second wavelength regime.

D10. The system of paragraph D, wherein the third processor functionality is further configured to generate a second set of corrected image data by removing common path distortion from the second set of image data, and to generate a second corrected image signal from the second set of corrected image data.

D11. The system of paragraph D, wherein the second processor functionality is configured to identify at least one image characteristic that is a deterministic function of wavelength.

D12. The system of paragraph D, further comprising a display configured to present image data output by the processor.

The foregoing examples are meant to describe specific classes of embodiments according to the present teachings, but the present teachings contemplate a broader range of possibilities. For instance, although the examples above describe the use of either two separate sensors or a single multispectral sensor, any desired number of sensors may be used in conjunction with the present teachings. This includes three or more separate sensors receptive to overlapping or non-overlapping wavelength regimes, or a single sensor receptive to three or more continuous or non-continuous wavelength regimes. As a specific example, the present teachings contemplate sensing visible light, SWIR, MWIR, and LWIR simultaneously, and processing all of these images in a manner similar to the methods described above. This can include the separation of the captured visible light image into blue, green, and red images, or into any other desired wavelength regimes.

Furthermore, although the examples above primarily describe an integrated approach wherein phase distortions and/or apparent motions are determined from the input image data and used to generate apparent motion maps, the present teachings also contemplate using wavelength-dependent phase distortions exclusively to determine the apparent motion maps. In this case, the apparent motion maps might more appropriately be referred to as "phase distortion maps" or "image characteristic maps," which can be used in conjunction with known correlations between phase distortion and other types of distortion to determine the overall wavelength-dependent distortion captured in the raw image data. In general, any visible or invisible distortion effect which is dependent on wavelength may be used according to the present teachings to identify and correct visible image distortions on a frame-to-frame basis.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. A method of image correction, comprising:
collecting image data in a range of wavelengths that includes at least a first wavelength and a second wavelength;
processing the image data to determine a first apparent motion map from image data collected at the first wavelength and a second apparent motion map from image data collected at the second wavelength;
processing the first and second apparent motion maps to distinguish changes caused by wavelength-dependent distortion from changes caused by object motion;
generating a first set of corrected image data by removing changes caused by wavelength-dependent distortion from the collected image data; and
generating a first corrected image from the first set of corrected image data.

2. The method of claim 1, wherein the changes caused by wavelength-dependent distortion comprise apparent image motions, and wherein the step of generating a first set of corrected image data includes removing the apparent image motions from the collected image data while retaining real object motion.

3. The method of claim 1, further comprising:
generating a second set of corrected image data by removing changes caused by wavelength-dependent distortion from the collected image data; and
generating a second corrected image from the second set of corrected image data.

4. The method of claim 1, the range of wavelengths including at least a third wavelength, further comprising:
processing the image data to determine a third apparent motion map from image data collected at the third wavelength; and
processing the third apparent motion map, in conjunction with processing the first and second apparent motion maps, to further distinguish changes caused by wavelength-dependent distortion from changes caused by object motion.

5. The method of claim 1, wherein the step of collecting image data includes collecting image data at a plurality of times corresponding to different image frames.

6. The method of claim 5, wherein the first apparent motion map is determined by calculating optical flow corresponding to image data collected at the first wavelength at the plurality of times, and wherein the second apparent motion map is determined by calculating optical flow corresponding to image data collected at the second wavelength at the plurality of times.

7. The method of claim 1, wherein the first wavelength falls within the mid-wave infrared radiation (MWIR) spectrum and the second wavelength falls within the long-wave infrared radiation (LWIR) spectrum.

8. The method of claim 1, wherein processing the first and second apparent motion maps includes comparing differences in the first and second apparent motion maps with distortion differences expected between image data collected at the first and second wavelengths.

9. The method of claim 1, further comprising generating a first moving object map corresponding to image data collected at the first wavelength and attributable to object motion, wherein the step of generating the first set of corrected image data includes comparing the first moving object map to the first apparent motion map.

10. The method of claim 9, further comprising:
generating a second moving object map corresponding to image data collected at the second wavelength and attributable to object motion;
generating a second set of corrected image data by comparing the second moving object map to the second apparent motion map; and
generating a second corrected image from the second set of corrected image data.

11. The method of claim 1, further comprising providing at least one image-collecting device and a processor, wherein the step of collecting image data is performed using the at least one image-collecting device, and wherein the step of processing is performed using the processor.

12. An image correction system, comprising:
image-collecting apparatus configured to collect a first set of image data in a first wavelength regime and a second set of image data in a second wavelength regime; and
a processor configured to perform first, second, and third processor functionalities;
wherein the first processor functionality involves determining a first apparent motion map from the first set of image data and a second apparent motion map from the second set of image data;

wherein the second processor functionality involves analyzing the first and second apparent motion maps to identify collected image data caused by common path distortion; and wherein the third processor functionality involves generating a first set of corrected image data by removing common path distortion from the first set of image data, and generating a first corrected image signal from the first set of corrected image data.

13. The system of claim 12, wherein the third processor functionality is further configured to generate a second set of corrected image data by removing common path distortion from the second set of image data, and to generate a second corrected image signal from the second set of corrected image data.

14. The system of claim 12, wherein the second processor functionality is configured to identify at least one image characteristic that is a deterministic function of wavelength.

15. The system of claim 12, further comprising a display configured to present image data output by the processor.

* * * * *